United States Patent [19]
Furtwängler et al.

[11] Patent Number: 6,097,129
[45] Date of Patent: Aug. 1, 2000

[54] ELECTRONICALLY COMMUTATED MOTOR

[75] Inventors: Patrick Furtwängler, Schonach; Hermann Rappenecker, Vöhrenbach; Harald Reich, St. Georgen; Gabor Szondi, Königsfeld, all of Germany

[73] Assignee: Papst-Motoren GmbH & Co. KG, Germany

[21] Appl. No.: 09/273,047

[22] Filed: Mar. 19, 1999

[30] Foreign Application Priority Data

Mar. 21, 1998 [DE] Germany ............................ 298 05 175

[51] Int. Cl.[7] ...................................................... H02K 1/12
[52] U.S. Cl. ........................ 310/256; 310/190; 310/209; 310/223; 310/172; 310/161; 310/157; 310/67 R; 310/68 R; 310/68 B; 310/DIG. 3; 318/514.31; 318/514.32; 318/514.33; 327/509; 327/510; 360/99.7; 360/99.04
[58] Field of Search ....................................... 310/256, 190, 310/209, 223, 172, 161, 157, DIG. 3, 67 R, 68 R, 68 B; 318/514.31, 514.32, 514.33; 327/509, 510, 511; 360/99.04, 99.7, 99.8, 98.7, DIG. 3

[56] References Cited

U.S. PATENT DOCUMENTS

| | | | |
|---|---|---|---|
| 3,411,027 | 11/1968 | Rosenberg ............................... | 310/181 |
| 3,805,134 | 4/1974 | Osamu et al. ........................... | 318/254 |
| 4,529,900 | 7/1985 | Uzuka ...................................... | 310/43 |
| 4,638,197 | 1/1987 | Kalagidis ................................ | 310/67 R |
| 4,934,041 | 6/1990 | Hoover et al. ............................ | 29/596 |
| 5,623,382 | 4/1997 | Moritan et al. ....................... | 360/99.08 |
| 5,663,604 | 9/1997 | Takahashi ................................ | 310/91 |
| 5,912,516 | 6/1999 | Atkinson et al. ..................... | 310/67 R |
| 5,952,760 | 9/1999 | Miyazawa et al. ..................... | 310/194 |

FOREIGN PATENT DOCUMENTS

| | | |
|---|---|---|
| 22 45 557 | 3/1973 | Germany . |
| 35 13 167 C2 | 10/1986 | Germany . |
| 36 33 241 A1 | 4/1987 | Germany . |
| 43 31 862 A1 | 3/1995 | Germany . |
| 196 08 424 A1 | 9/1997 | Germany . |

*Primary Examiner*—Nestor Ramirez
*Assistant Examiner*—Thanh Lam
*Attorney, Agent, or Firm*—Robert W. Becker & Associates

[57] ABSTRACT

An electronically commutated external rotor motor has an external rotor having a cup-shaped housing and a radially magnetized permanent magnet connected in the cup-shaped housing. An interior stator is positioned in the cup-shaped housing. The interior stator has a laminated core having grooves. Windings are provided within the grooves. The windings have first end turns proximal to a bottom of the cup-shaped housing and second end turns positioned distal to the bottom. The first and second end turns electrically connect the windings to one another. The permanent magnet has an end face remote from the bottom of the cup-shaped housing. At least one galvano-magnetic rotor position sensor is arranged opposite the end face of the permanent magnet so as to be located within a magnetic leakage of the permanent magnet and within a magnetic leakage of the interior stator. The at least one rotor position sensor is designed to control current within at least a portion of the windings. A magnetic leakage flux concentrator is arranged at the interior stator at the second end turns at a side of the second end turns facing away from the laminated core and positioned at least within an angular area of the interior stator in which the at least one rotor position sensor is located.

13 Claims, 10 Drawing Sheets

$T1 = H1 \cdot \overline{H2}$ $B1 = \overline{H1} \cdot H2$

$T2 = H2 \cdot \overline{H3}$ $B2 = \overline{H2} \cdot H3$ $T3 = \overline{H1} \cdot H3$ $B3 = H1 \cdot \overline{H3}$

ELECTRONICALLY COMMUTATED MOTOR

BACKGROUND OF THE INVENTION

The present invention relates to an electronically commutated motor with an electromagnetic rotor and a stator. It has been known from DE-PS 285210 C2 that stator leakages have a negative impact on the commutation of an electronically commutated motor because they exhibit a disturbing interference with respect to the Hall generator.

It is an object of the invention to suggest a novel electronically commutated motor.

SUMMARY OF THE INVENTION

This object is solved according to the invention by an electronically commutated external rotor motor with an external rotor that is provided with a radially magnetized permanent magnet arranged within a cup-shaped housing, with an interior stator comprising a stack of sheet metal plates (laminated core, stacked laminations) having grooves in which windings are provided which are electrically connected to one another by end turns at both ends of the stack of sheet metal plates (laminated core, stacked laminations). The inventive motor is further provided with at least one galvano-magnetic rotor position sensor which is arranged approximately opposite the end face of the rotor magnet that faces away from the bottom of the cup-shaped housing within a leakage area of the rotor magnet and also a leakage area of the interior stator. The rotor position sensor is designed to control the currents in, at least, a portion of the windings. The motor is also provided with a flux concentrator ("absorption plate") for the leakage of the interior stator. The flux concentrator is arranged at the end turns opposite the bottom of the cup-shaped housing, at the side opposite the stack of sheet metal plates (laminated core) of the interior stator and, at least, within the angular area of the interior stator in which the at least one rotor position sensor is provided.

The effect is that the rotor position sensor transmits a significantly improved signal and that a more exact commutation occurs, especially when accelerating and stopping the motor.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of the embodiments, diagrams and tables according to FIGS. 1–13.

Figure 1:
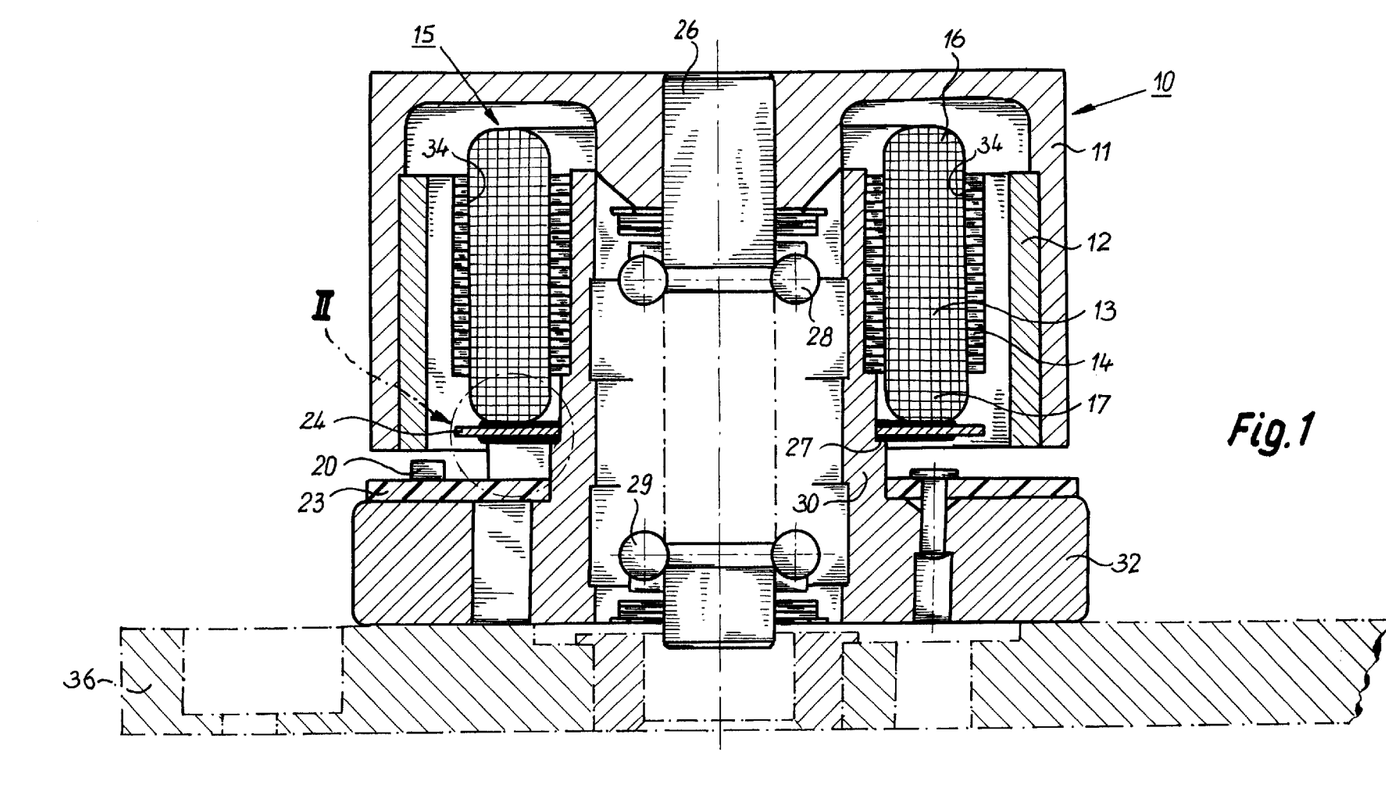
FIG. 1 shows a schematic illustration of an electronically commutated external rotor motor with an absorption plate in longitudinal cross-section.
Figure 2:
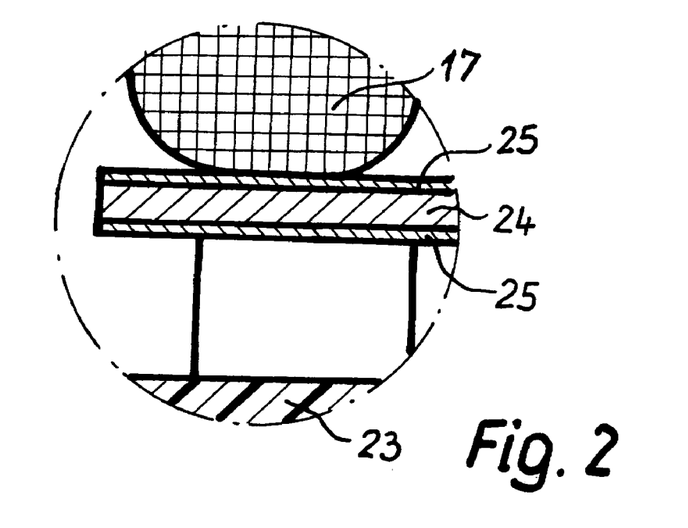
FIG. 2 shows an enlarged detail illustration of the absorption plate according to FIG. 1.
Figure 3:
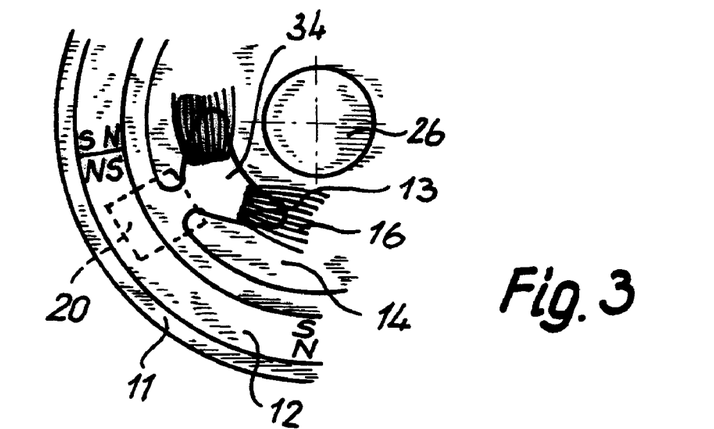
FIG. 3 shows a plan view of a groove with a partially indicated galvano-magnetic rotor position sensor.

FIG. 1, FIG. 2, and FIG. 3 illustrate an electronically commutated external rotor motor.

An external rotor 10 provided with a radially magnetized permanent magnet 12 arranged within a cup-shaped housing 11 made of a ferromagnetic material is pressed onto a rotor shaft 26 which is supported axially and radially by ball bearings 28 and 29 within a bearing support tube 30.

The bearing support tube 30 is connected to a base plate 36 by flange 32 of the bearing (30, 32).

An interior stator 15 is provided with a laminated core 14 resting on the bearing support tube 30 and having windings 13 arranged in its grooves 34. The windings 13 are electrically connected at both ends of the laminated core by end turns 16 and 17. In operation, these end turns 16, 17 produce a magnetic leakage which is greater, the higher the current is that runs through the windings 13.

A printed circuit board 23 is arranged on the flange 32 of the bearing support tube 30 below the open side of the cup-shaped housing 11 of the external rotor 10. Approximately opposite the lower end face of the permanent magnet 12, and also within the leakage area of the interior stator 15, at least one galvano-magnetic rotor position sensor 20 is arranged on the printed circuit board 23.

At the end turns 17 of the interior stator 15, opposite the bottom of the cup-shaped housing 11, an "absorption plate" 24 is arranged that is made out of a ferromagnetic material, e.g., out of transformer sheet. The absorption plate 24 can also be called a flux concentrator. The flux concentrator or absorption plate 24 can be embodied in various ways which all have in common that they are, at least, positioned in the area of the interior stator 15 in which the at least one rotor position sensor 20 is arranged. The flux concentrator 24 has a maximum radial extension which is predetermined by the interior radius of the permanent magnet 12, however, normally is smaller than that radius. The final determination of the radial extension at the location of the galvano-magnetic rotor position sensor 20 is only possible through experimentation. In this embodiment, the flux concentrator 24 is coated on both sides with an insulating layer 25.

The flux concentrator 24 has the contour of an annular disc because when having this shape it will not produce an interfering torque when interacting with the permanent magnet 12. The flux concentrator 24 is attached with its inner circumference to a ring shoulder 27 of the bearing support tube 30 which is preferably made of a magnetically conductive material. The flux concentrator 24 can, additionally, be fused to the end turns 17 in order to prevent a movement of the absorption plate 24 with respect to the end turns 17. This can be achieved by bonding, e.g. by means of powder coating. In this embodiment, the exterior diameter of the absorption plate 24 approximately corresponds to the exterior diameter of the laminated core 14.

Figure 12:
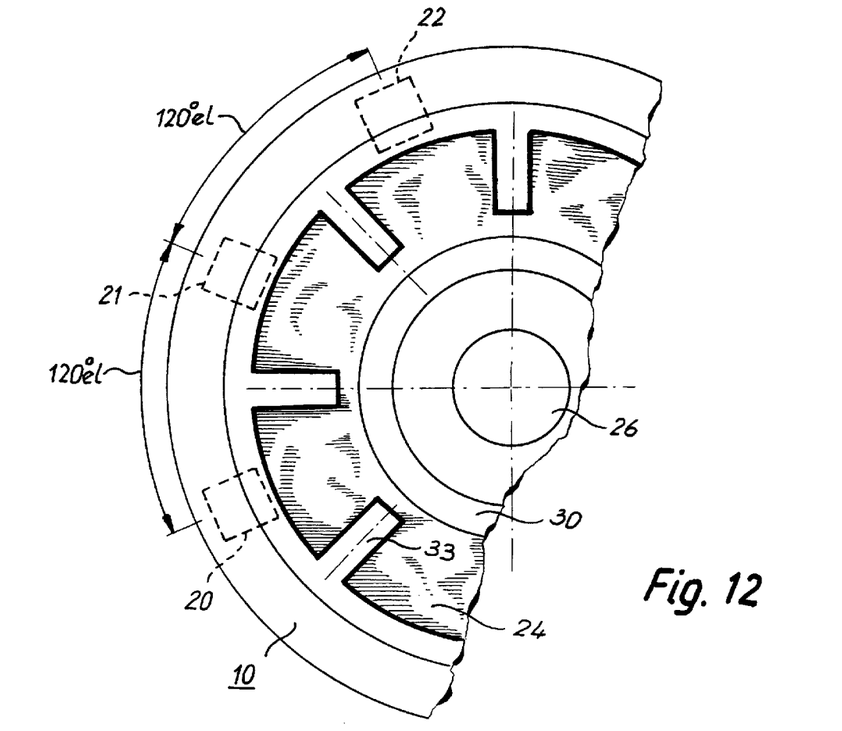
FIG. 12 shows a plan view of an absorption plate of a motor with three galvano-magnetic rotor position sensors.

FIG. 12 shows a plan view of a flux concentrator 24 of a motor with three galvano-magnetic rotor position sensors 20, 21, and 22. The external rotor 10 and its shaft 26 are schematically illustrated. The flux concentrator 24, here resting on the bearing support tube 30, is provided with radial slots 33 which prevent the creation of great turbulent flows. The galvano-magnetic rotor position sensors 20, 21, and 22 are preferably located in an angular area between two slots 33.

Figure 7:
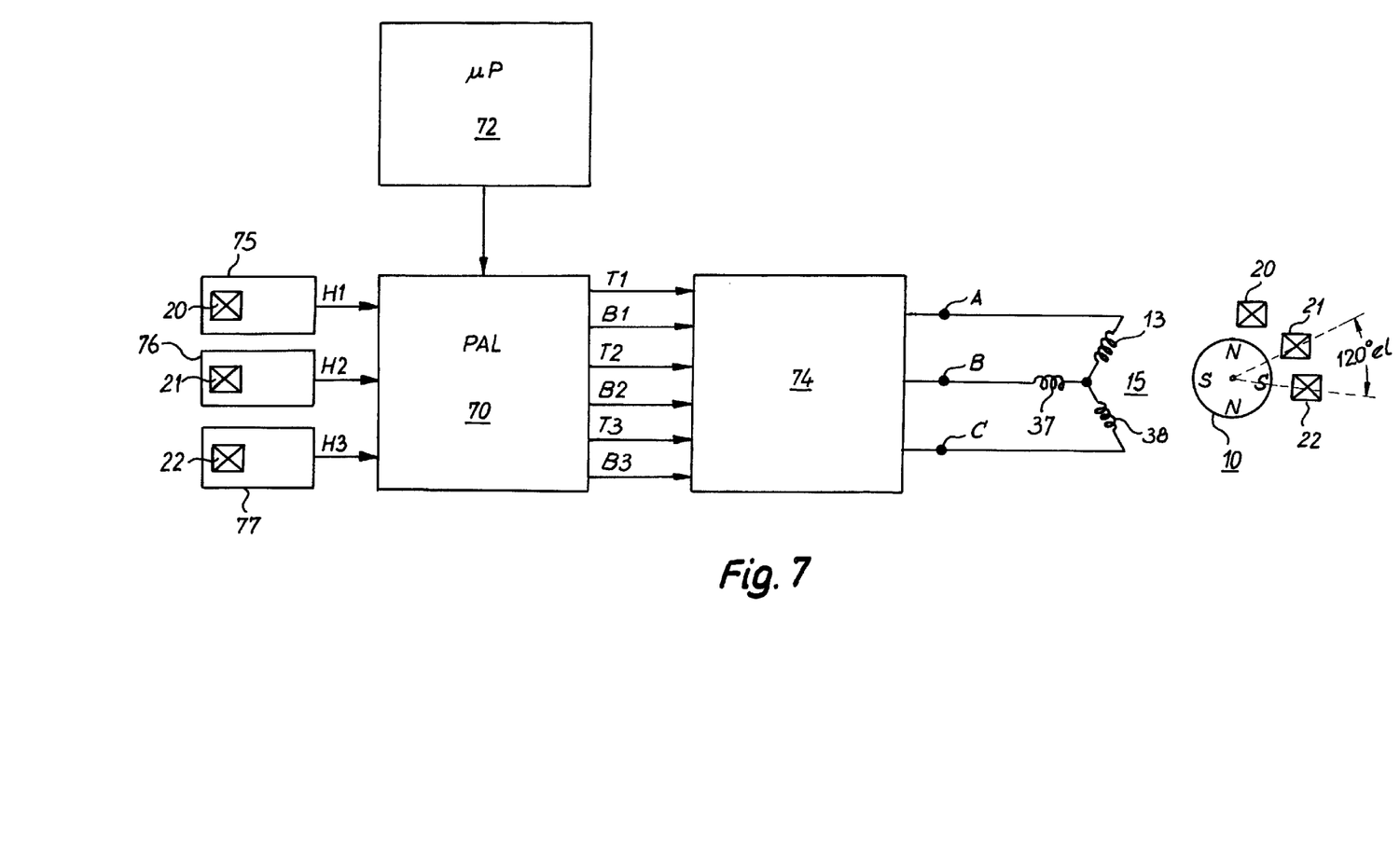
FIG. 7 shows a block diagram of a three-phase non-collector dc motor with which the present invention is preferably employed.

FIG. 7 shows a block diagram of a three-phase electronically commutated motor as an example. This motor has at its interior stator 15 a stator winding (here wired, as an example, in a star connection) with three phases 13, 37, and 38, the contacts of which are designated as A, B, and C. Furthermore, the motor has an electromagnetic four pole rotor 10 (only schematically indicated). In its magnetic leakage area, three galvano-magnetic rotor position sensors 20, 21, and 22 are arranged at the interior stator 15 at a distance of 120° el. FIG. 1 shows only one of these three sensors, namely, rotor position sensor 20.

Figure 10:
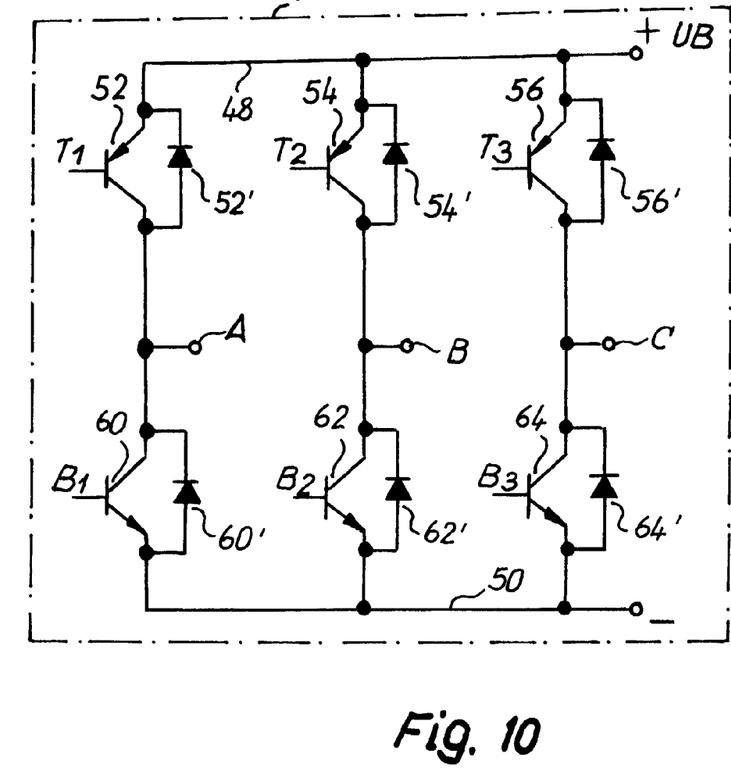
FIG. 10 shows a full bridge circuit as used in FIG. 7, FIG. 11 illustrations of the time sequences to describe the exemplary motor of FIG. 7.

To excite the stator windings 13, 37, and 38, a full bridge circuit 74 is provided as an exemplary embodiment, the design of which is illustrated in FIG. 10. It has three "upper" transistors 52, 54, and 56 in the form of pnp transistors whose emitters are each connected to a positive line 48 and whose commutators are connected to the contacts A or B or C. The full bridge circuit 74 is further provided with three "lower" transistors 60, 62, and 64 in the form of npn transistors whose emitters are connected to a negative line 50 and whose commutators are connected to the contacts A or B or C. Recovery diodes are respectively parallel connected.

Figure 9:
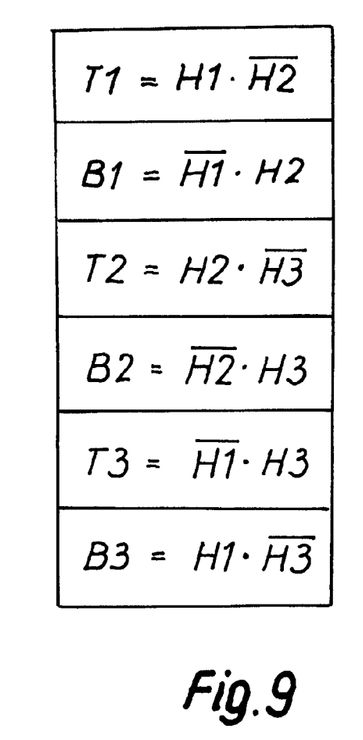
FIG. 9 shows a table illustrating the logic connections according to FIG. 7.

The signals T1, T2, and T3 are used for supplying the upper transistors 52, 54, and 56 with current, and the "lower" signals B1, B2, B3 are used for supplying the lower transistors with current. These signals are derived from the signals H1, H2, H3 which are derived from the galvano-magnetic rotor position sensors 20, 21, and 22. How this is accomplished will be described in the following. The logic equations are illustrated in FIG. 9. For example, the transistor 52 is turned on by the signal Ti when signal Hi is high and signal H2 is low. This is also true for the other transistors; this can be taken from the shown logic equations.

The signals T1 through B3 are generated from signals H1, H2, and H3 in a programmable logic circuit (PAL) 70. PAL 70 can be programmed correspondingly. Furthermore, FIG. 7 shows a micro-processor 72, the function of which is, e.g., to control the direction of rotation of the motor.

Furthermore, the circuits 75, 76, and 77 of the galvano-magnetic rotor position sensors 20, 21, and 22 are schematically illustrated in FIG. 7.

Figure 8:
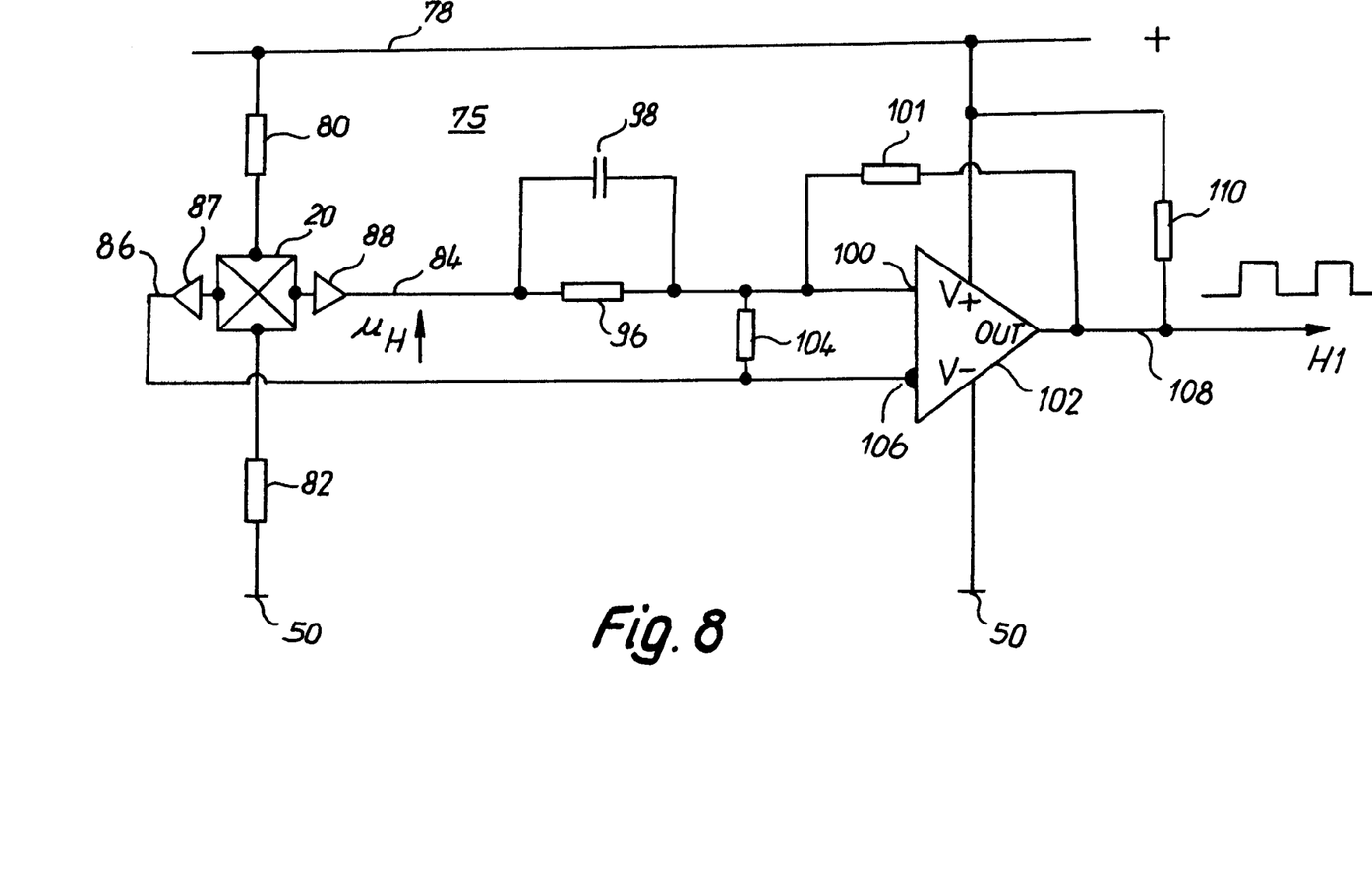
FIG. 8 shows a wiring diagram for determining the rotor position and for rotation-dependently changing the phase position of the received rotor position signals.

FIG. 8 shows as an example circuit 75 for the signal Hi. The circuits 76 and 77 have respectively identical designs.

The employed rotor position sensor 20 is preferably a Hall generator, e.g., the Hall generator type HW101C. The outputs 84 and 86 each have an amplified Hall signal.

A resistor 80 is positioned between the galvano-magnetic rotor position sensor 20 and the positive line 78, and a resistor 82 is positioned between the galvano-magnetic rotor position sensor 20 and the negative line 50. The resistors 80 and 82 determine the maximum current through the galvano-magnetic rotor position sensor. The resistor 80 creates a potential shift because the comparator 102 cannot operate with an input voltage of the same value as its positive working voltage at the line 78.

The signals of the galvano-magnetic rotor position sensors 20 are amplified by two analog pre-amplifiers 87 and 88. The output 84 of the analog pre-amplifier 88 is connected with the noninverting input 100 of a comparator 102 via the parallel wiring of a resistor 96 and a capacitor 98 (phase shift member). This noninverting input 100 is connected via a high-value resistor 101 to the output 108 and via a resistor 104 to the inverting input 106 which is connected to the output 86 of the analog pre-amplifier 87.

At the output 108 of the comparator 102, the rectangular signal H1 is present during operation which controls the motor according to FIG. 7. The output 108 is connected to the positive line 78 via a resistor 110.

Figures 11A, 11B:
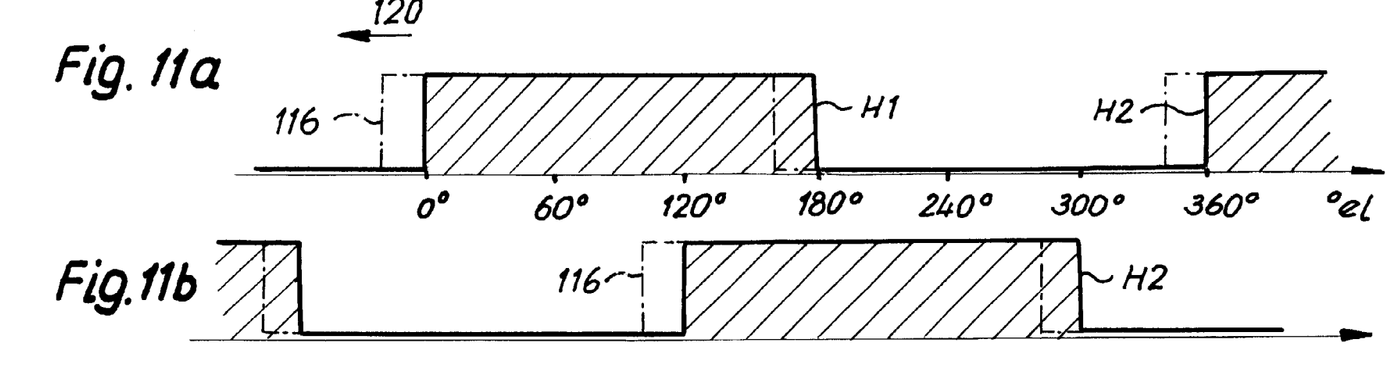
Figure 11C:
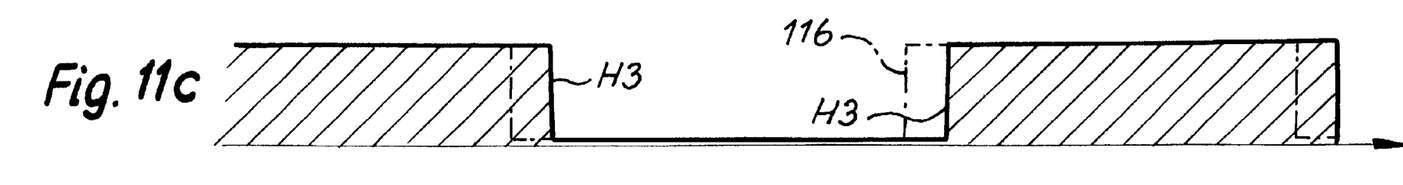

The high-value resistor 101, if used, provides hysteresis. The parallel wiring of the resistor 96 and the capacitor 98 upstream of the comparator input (noninverting input) 100 creates a leading angle shift 120 as illustrated in FIG. 11 for the output signals H1, H2, and H3. "Leading angle" is the designation of the beginning of the commutation. At higher rotations, the commutation is produced by the phase-shift signals 116 which are provided at the output of the comparator of the respective circuit 75, 76, or 77 (FIG. 7).

It is understood that the invention is not limited to three-phase motors, but is suitable for all motors which are provided with at least one rotor position sensor.

Figure 4:
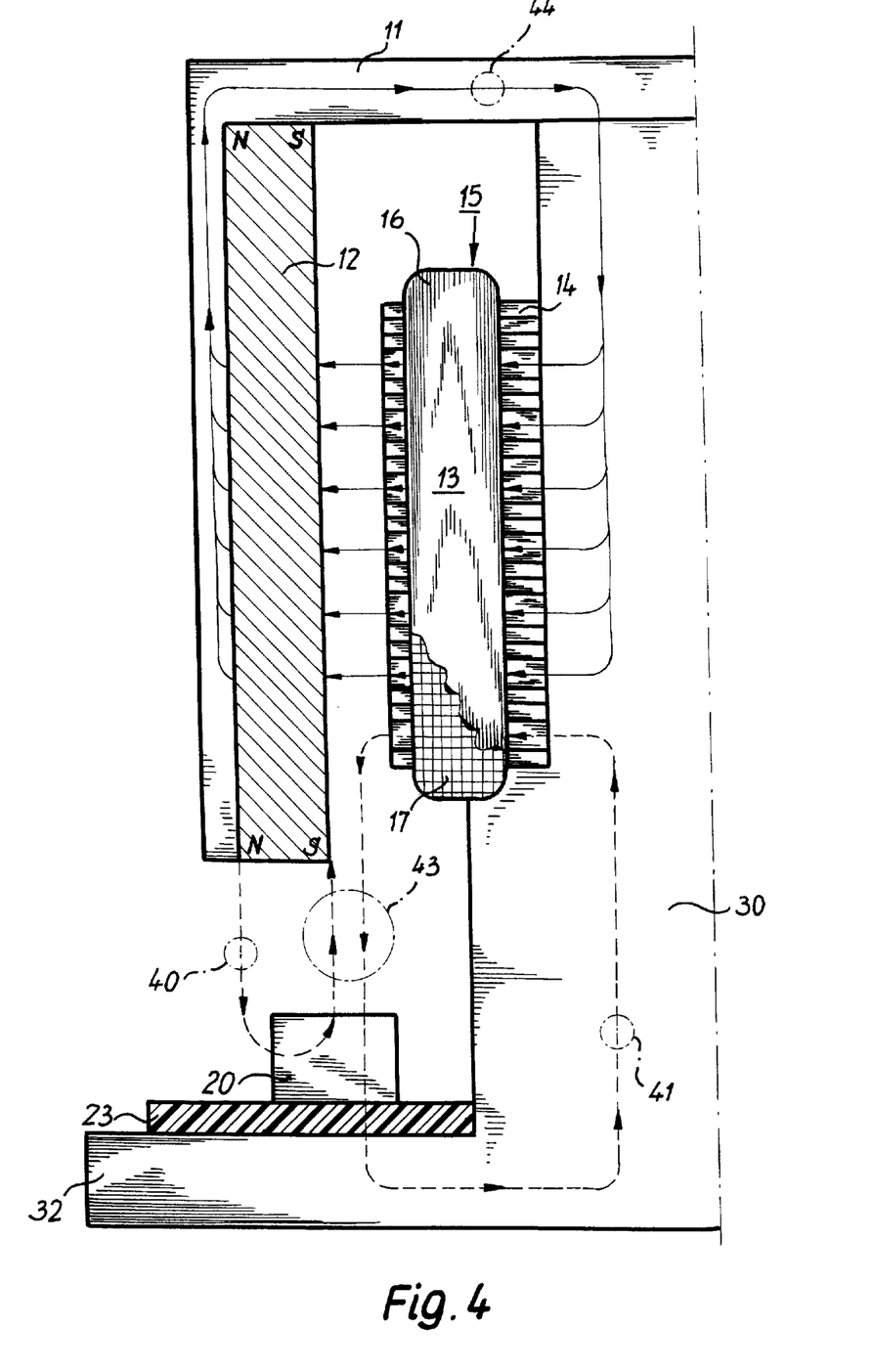
FIG. 4 shows a schematic illustration of the magnetic fluxes of a motor according to FIG. 1, however, without an absorption plate.
Figure 5:
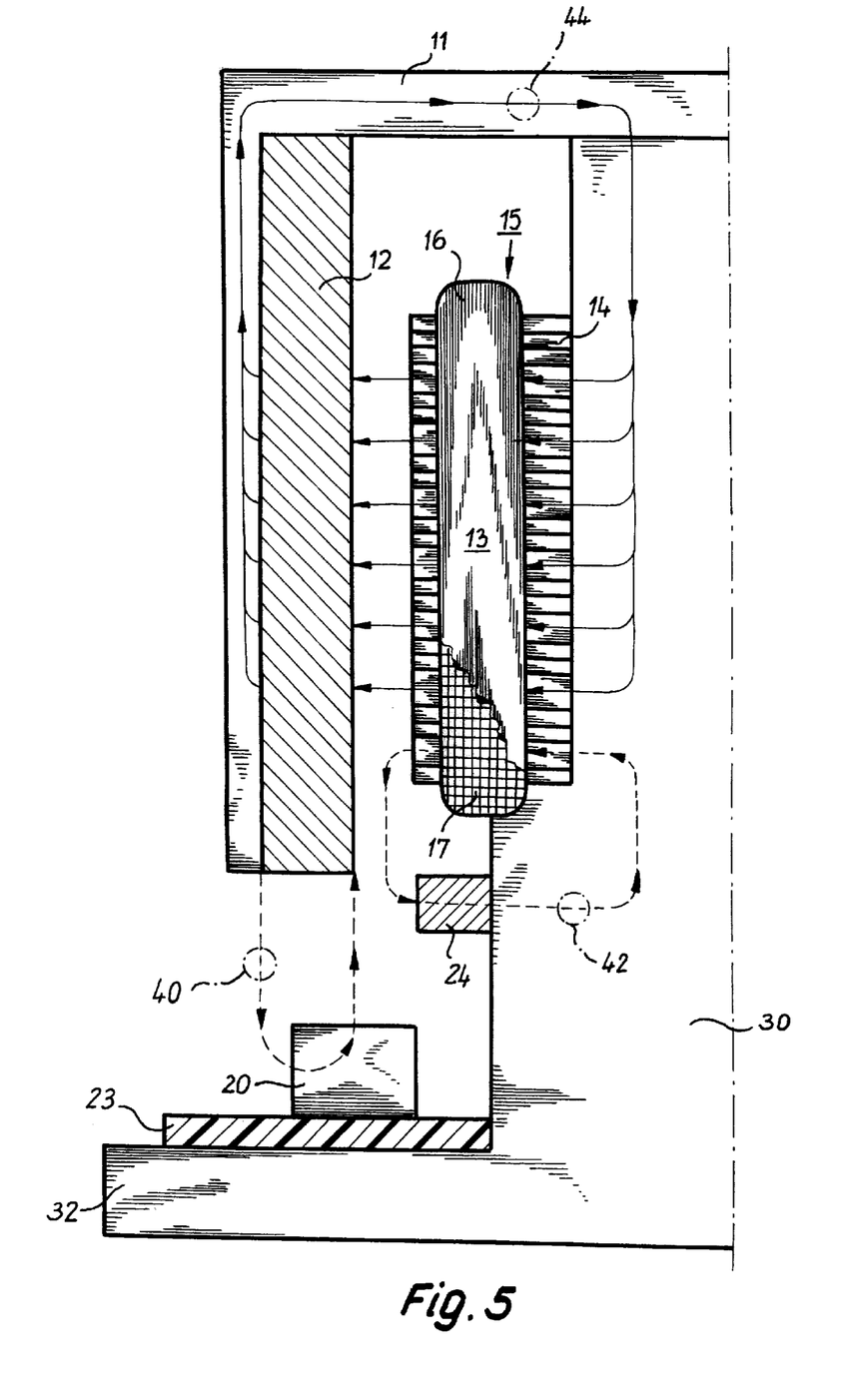
FIG. 5 shows a schematic illustration of the magnetic fluxes of a motor according to FIG. 1, FIGS. 6a, 6b illustrate measurements with an analog galvano-magnetic rotor position sensor inside a motor according to FIG. 1, without and with a absorption plate, respectively.
Figure 13:
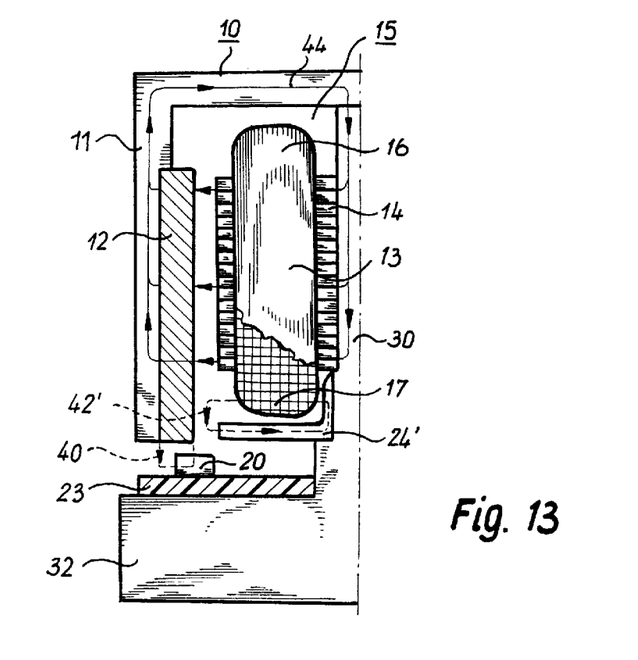
FIG. 13 shows a basic illustration of the magnetic fluxes of a motor according to FIG. 1, with a bearing support tube and a flange made of a non-ferromagnetic material.

FIG. 4 shows a schematic illustration of the magnetic fluxes in a motor according to FIG. 1, however, without an absorption plate (flux concentrator). FIG. 5 shows the magnetic fluxes with absorption plate 24. FIG. 13 shows a preferred variation of FIG. 5, with the bearing support tube 30 and the flange 32 consisting of a non-ferromagnetic material, e.g., aluminum or plastic.

The permanent magnet 12 arranged within the cup-shaped housing 11 produces a magnetic control flow (magnetic leakage) 40 at the location of the galvano-magnetic rotor position sensor 20, corresponding to the magnetization that is dependent on the rotor position. Due to the magnetic control flow 40, the winding 13 is provided with current such that the motor rotates in the desired direction because of the main flux 44. When the magnetic control flow 40 changes at the location of the galvano-magnetic rotor position sensor 20, a commutation of the windings 13 occurs and the fluxes change their direction accordingly.

Preferably, the bearing support tube 30 and the flange 32 consist of ferromagnetic material. However, motors are manufactured also whose bearing support tube 30 and flange 32 are made of a non-ferromagnetic material, e.g., aluminum or plastic.

When there is no absorption plate (flux concentrator) 24 but a bearing support tube 30 and a flange 32 consisting of ferromagnetic material, the magnetic leakage 41 produced by the end turn 17 flows via the galvano-magnetic rotor position sensor 20 to the flange 32 of the bearing support tube 30 and from there back to the laminated core 14 via the bearing support tube 30.

This magnetic leakage 41 counteracts the magnetic control flow 40 of the permanent magnet 12 in the area 43 of the rotor position sensor 20, and therefore reduces the input signal of the galvano-magnetic rotor position sensor 20 the more the current within the interior stator 15 increases.

When a bearing support tube 30 and a flange 32 are made out of non-ferromagnetic material, the flange 32 and the bearing support tube 30 have, magnetically, the same conductivity as air. However, an interference of the galvano-magnetic rotor position sensor 20 also occurs because of the magnetic leakage 41 of the interior stator 15 if the motor is compactly built and powerful.

Figure 6A:
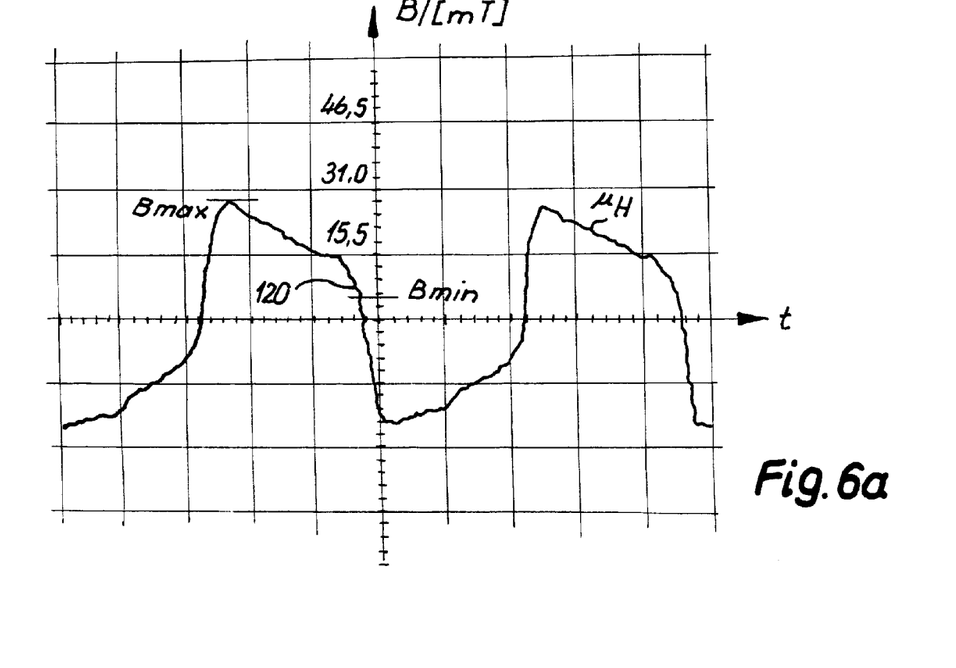
Figure 6B:
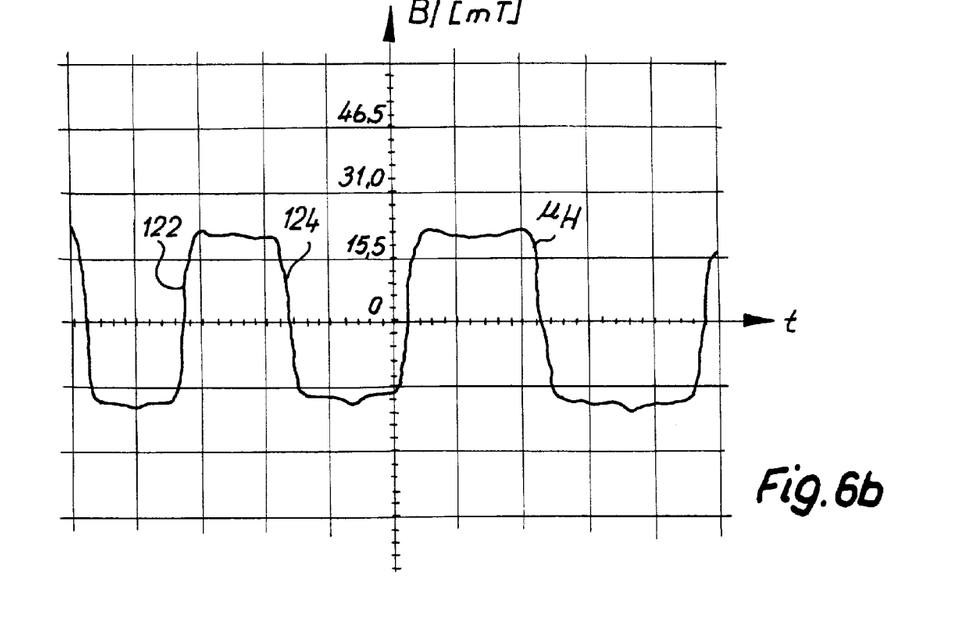

FIG. 6a illustrates a corresponding measurement of a motor with a bearing support tube 30 and a flange 32 made of steel with an analog galvano-magnetic rotor positions sensor (Hall generator). Here, the galvano-magnetic rotor position sensor 20 only senses an irregular, asymmetrical magnetic flux. Undefined forward break-over points appear in the transition area 120. This leads to a quickly alternating on- and off-switching of the transistors 52 through 64 within the full bridge circuit 74 and, therefore, to a high thermal load, especially when accelerating and stopping the motor.

The windings 13, 37, and 38 are improperly supplied with current within the commutation area and this results in a significant decrease in the performance of the motor, especially when accelerating and stopping the motor. Furthermore, in the case of a full bridge circuit as illustrated in FIG. 10, a simultaneous on-switching of the transistors 52 through 60 of the full bridge circuit 74 can occur because of the undefined forward break-over point. This results in a short circuit leading to a destruction of the full bridge circuit 74.

When the absorption plate (flux concentrator) 24, the bearing support tube 30, and the flange 32 are made of a ferromagnetic material, as illustrated in FIG. 5, the magnetic leakage 42 produced by the end turn 17 flows over the magnetically well conductive absorption plate 24 and from there back to the laminated core 14 via the bearing support tube 30. This can be interpreted as the magnetic leakage 42 being attracted and absorbed by the absorption plate 24. Thus, the galvano-magnetic rotor position sensor 20 is hardly affected by the leakage of the interior stator 15. This can clearly be seen when comparing FIG. 6b (with absorption plate) and FIG. 6a (without absorption plate), i.e., in FIG. 6b, the signal $\mu_H$ has exactly defined flanks 122 and 124 between the outputs 84 and 86 of the rotor position sensor 20.

FIG. 13 shows the fluxes for a motor with an absorption plate 24 and with a bearing support tube 30 and a flange 32 made of a non-ferromagnetic material.

The magnetic flux 42' produced by the end turn 17 flows via the magnetically well-conducting absorption plate 24' back to the laminated core 14. The absorption plate 24' is advantageously extended at the magnetically non-conductive bearing support tube 30 toward the laminated core 14 such that the magnetic flux 42' is conducted back to the laminated core 14 without any interference.

Thus, a secure and reliable commutation of the motor is accomplished with respect to all operation modes. The cover plate protects the members from magnetic interferences so that also the thermal impact on the sensors does not result in a negative impact on the operational reliability.

Furthermore, the efficiency of the motor is significantly improved in all operational modes.

The specification incorporates by reference the disclosure of German priority document 298 05 175.3 of Mar. 21, 1998.

The present invention is, of course, in no way restricted to the specific disclosure of the specification and drawings, but also encompasses any modifications within the scope of the appended claims.

What is claimed is:

1. An electronically commutated external rotor motor, comprising:

an external rotor comprising a cup-shaped housing and a radially magnetized permanent magnet connected to said cup-shaped housing;

an interior stator in magnetic interaction with said external rotor;

said interior stator comprising a laminated core;

said laminated core comprising slots;

winding means provided in said slots;

said winding means comprising first winding heads proximal to a bottom of said cup-shaped housing and second winding heads positioned distal to said bottom of said cup-shaped housing;

said permanent magnet having an en d face remote from said bottom of said cup-shaped housing;

at least one galvano-magnetic rotor position sensor for controlling current flow within said winding means;

said at least one galvano-magnetic rotor position sensor being arranged substantially opposite to said remote end face of said permanent magnet so as to be located within a magnetic leakage flux of said permanent magnet and within a magnetic leakage flux of said interior stator;

a magnetic leakage flux concentrator provided on said interior stator at a side of said second winding heads facing away from said laminated core and at least within an angular area of said interior stator in which said at least one galvano-magnetic rotor position sensor is located.

2. An external rotor motor according to claim 1, wherein said magnetic leakage flux concentrator is a ferromagnetic member extending perpendicularly to a center axis of said interior stator in a direction of the field lines of said magnetic leakage flux exiting said second winding heads.

3. An external rotor motor according to claim 1, wherein said magnetic leakage flux concentrator is ring-shaped and comprises a ferromagnetic material.

4. An external rotor motor according to claim 3, further comprising a shaft connected to said cup-shaped housing and a bearing support tube in which said shaft is rotatably supported, wherein said magnetic leakage flux concentrator is attached to said bearing support tube.

5. An external rotor motor according to claim 3, wherein said magnetic leakage flux concentrator comprises a radially inwardly positioned projection extending toward said laminated core.

6. An external rotor motor according to claim 3, wherein said magnetic leakage flux concentrator has radial slots in order to reduce turbulent flows.

7. An external rotor motor according to claim 1, wherein said at least one galvano-magnetic rotor position sensor produces two output signals each amplified by an analog pre-amplifier.

8. An external rotor motor according to claim 7, wherein said two output signals of said at least one galvano-magnetic rotor position sensor are each connected to a respective input of a comparator.

9. An external rotor motor according to claim 8, wherein a phase shift member is provided for one of said output signals of said galvano-magnetic rotor position sensors upstream of said respective input of said comparator in order to shift commutation with increasing rpm of said external rotor motor toward an earlier time line.

10. An external rotor motor according to claim 9, wherein said phase shift member and a capacitor wired in parallel and wherein a second resistor is provided between said inputs of said comparator.

11. An electronically commutated external rotor motor, comprising:

an external rotor having a cup-shaped housing and a radially magnetized permanent magnet connected to said cup-shaped housing;

an interior stator in magnetic interaction with said external rotor;

said interior stator comprising a laminated core;

winding means arranged in said laminated core;

said winding means comprising first winding heads and second winding heads at opposite ends of said laminated core;

said first winding heads positioned proximal to a bottom of said cup-shaped housing and said second winding heads positioned distal to said bottom of said cup-shaped housing;

said permanent magnet having an end face distal to said bottom of said cup-shaped housing;

at least one galvano-magnetic rotor position sensor for controlling current flow within said winding means;

said at least one galvano-magnetic rotor position sensor being arranged substantially opposite to said distal end face of said permanent magnet so as to be located within a magnetic leakage flux of said permanent magnet and within a magnetic leakage flux of said interior stator;

an annular magnetic leakage flux concentrator comprising of ferromagnetic material on said interior stator at a side of said second winding heads facing away from said laminated core.

12. An external rotor motor according to claim 11, further comprising a shaft connected to said cup-shaped housing and a bearing support tube in which said shaft is rotatably supported, wherein said magnetic leakage flux concentrator is attached to said bearing support tube.

13. An external rotor motor according to claim 11, wherein said magnetic leakage flux concentrator comprises radial slots for reducing turbulent flows.

* * * * *